United States Patent
Luo et al.

(10) Patent No.: US 7,536,191 B2
(45) Date of Patent: May 19, 2009

(54) PUSH-TO-TALK COMMUNICATIONS IN COMPUTING ENVIRONMENTS

(75) Inventors: Chong Luo, ShangHai (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 11/172,658

(22) Filed: Jul. 1, 2005

(65) Prior Publication Data

US 2007/0016828 A1 Jan. 18, 2007

(51) Int. Cl.
*H04W 24/02* (2009.01)

(52) U.S. Cl. .................. 455/457; 370/293; 379/88.17; 455/518; 455/552.1; 714/38; 715/202; 715/736

(58) Field of Classification Search ............ 379/88.17; 455/457, 518, 552.1; 714/38; 715/202, 736; 370/293
See application file for complete search history.

(56) References Cited

U.S. PATENT DOCUMENTS

| | | | |
|---|---|---|---|
| 6,360,093 | B1 | 3/2002 | Ross et al. |
| 6,366,782 | B1 * | 4/2002 | Fumarolo et al. ............ 455/457 |
| 6,763,226 | B1 | 7/2004 | McZeal, Jr. |
| 7,257,199 | B2 * | 8/2007 | Carlson et al. ................ 379/35 |
| 7,266,382 | B2 * | 9/2007 | Noel et al. ................... 455/518 |
| 2004/0052339 | A1 | 3/2004 | Mirashrafi et al. |
| 2004/0100987 | A1 | 5/2004 | Marque-Pucheau |
| 2004/0192364 | A1 | 9/2004 | Ranalli et al. |
| 2004/0202117 | A1 | 10/2004 | Wilson et al. |
| 2004/0249949 | A1 | 12/2004 | Gourraud et al. |
| 2004/0254998 | A1 | 12/2004 | Horvitz |
| 2004/0266468 | A1 | 12/2004 | Brown et al. |
| 2006/0253770 | A1 * | 11/2006 | Bi et al. ........................ 715/500 |

FOREIGN PATENT DOCUMENTS

| | | |
|---|---|---|
| WO | WO 2005/015928 A1 | 2/2005 |
| WO | WO 2005/025255 A1 | 3/2005 |

OTHER PUBLICATIONS

PCT Search Report and Written Opinion for Patent Application No. PCT/US06/25509, mailed on Jan. 29, 2008, 9 pgs.
Push to talk over Cellular (PoC)—Architecture, http://member.openmobilealliance.org/ftp/public_documents/POC/Permanent_documents/OMA-AD-PoC-V1_0-20041117-D.zip, Nov. 2004, pp. 1-152.

(Continued)

*Primary Examiner*—Gerald Gauthier
(74) *Attorney, Agent, or Firm*—Lee & Hayes, PLLC

(57) ABSTRACT

Described is a communication mechanism that provides push-to-talk functionality for mobile and desktop computing environments. Mobile and desktop computers are configured as client computers in a client/server architecture. Some of the client computers are configured to handle multiple push-to-talk sessions simultaneously. If multiple streams from different sessions are active at the same time, the client computer may determine which of these overlapped streams to record and then record them for later playback. A server handles the registration of the client computers, manages the multiple sessions for each of the client computers, and performs a floor control process so that each push-to-talk session operates in a half-duplex mode.

14 Claims, 13 Drawing Sheets

OTHER PUBLICATIONS

"Motorola Push-to-talk over Cellular (PoC): Market Growth at the Push of a Button," Motorola, http://www.motorola.com/networkoperators/pdfs/new/PoC-WhitePaper.pdf, Feb. 2004, pp. 1-10.

"Push-to-talk Over Wireless," Northstream, http://www.northstream.se/page/custom/northnews/get_news_file.asp?id=38, Feb. 2004, pp. 1-8.

Clark, H. and Brennan, S., "Grounding in Communication," in L. Resnick, J. Levine and S. Teasley, Eds., Perspectives on Socially Shared Cognition, 1991, pp. 127-149, American Psychological Association, Washington DC.

Kraut, R., Fish, R., Root, B., and Chalfonte, B., "Informal Communication in Organizations: Form, Function, and Technology," Groupware and Computer Supported Co-operative Work, 1993, pp. 287-314, San Mateo, CA.

Whittaker, S., Frohlich, D., and Daly-Jones, O., "Informal workplace communication: What is it like and how might we support it?" in Proceedings of CHI'94 Human Factors in Computing Systems, 1994, pp. 131-137, ACM Press, New York.

Whittaker, S., Swanson, J., Kucan, J., and Sidner, C., "TeleNotes: Managing Lightweight Interactions in the Desktop," in ACM Transactions on Computer-Human Interaction, Jun. 1997, pp. 137-168, vol. 4, No. 2.

Woodruff, A. and Aoki, P.M., "How Push-To-Talk Makes Talk Less Pushy," ACM Group 2003, Nov. 9-12, 2003, Sanibel Island, FL.

"Pocket PC push-to-talk service launched in Korea," http://www.windowsfordevices.com/news/NS7661303465.html, Oct. 29, 2004.

Rosenburg, Art, "Converging Push-to-Talk At the Desktop? Parts 1 & 2", TMCnet.com, May 18, 2004.

Visual Communicator, PocketDownload.com, Nov. 27, 2004.

\* cited by examiner

PUSH-TO-TALK COMMUNICATIONS IN COMPUTING ENVIRONMENTS

BACKGROUND

The Internet has achieved widespread acceptance with the consuming public. Today people routinely communicate via the Internet using email and instant messaging. Email is considered an asynchronous method of communication because the parties involved in the communication do not necessarily need to be engaged in the communication at the same time. In contrast, in a synchronous method of communication, both parties involved in the communication need to be engaged at the same time (e.g., telephone conversation or a face-to-face conversation). Instant messaging provides another method of communication that is semi-synchronous. Instant messaging is a semi-synchronous method of communication because both parties may be aware of the other party, but do not need to be fully engaged in the conversation. For example, one party may be aware that the other party is engaging in the conversation by observing the status of the other party (e.g., typing text). However, the communication does not occur until the actual typed text is sent. In another example, each party is aware of the other parties that are available for communication based on the other parties' log-on status. While instant messaging is a semi-synchronous method of communication, it may also operate in an asynchronous communication manner. This occurs, for example, when one party sends an instant message to another party who is offline. The other party is unaware of the message until logging on at a later time.

Therefore, one can see that instant messaging provides a communication experience that is different than other communication mechanisms (e.g., email, telephone, etc). However, even with all the communication mechanisms available today, consumers still remain interested in new communication mechanisms that provide them with different communication experiences.

SUMMARY

The present communication mechanism provides push-to-talk functionality for mobile and desktop computing environments and offers a new communication experience for consumers. Mobile and desktop computers are configured as client computers in a client/server architecture. Some of the client computers are configured to handle multiple push-to-talk sessions simultaneously. If multiple streams from different sessions are active at the same time, the client computer may determine which of these overlapped streams to record and then record them for later playback. A server handles the registration of the client computers, manages the multiple sessions for each of the client computers, and performs a floor control process so that each push-to-talk session operates in a half-duplex mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following description is directed at a communication mechanism for providing push-to-talk functionality on mobile and desktop computing environments. The mobile and desktop computing environments include client computing devices configured in a client-server architecture with a server computing device. The server computing device is configured to handle registration, floor control, and session management. The push-to-talk functionality allows an outgoing session to be initiated upon recognition of a person's name and/or upon selection of a person's name from a user-interface on the client computing device. Incoming push-to-talk streams may be saved to a computer-readable storage media for later playback if another stream is already playing. Specific implementations of the push-to-talk communication concept that operate in various computing environments will now be described.

Exemplary Computing Device

Figure 1:
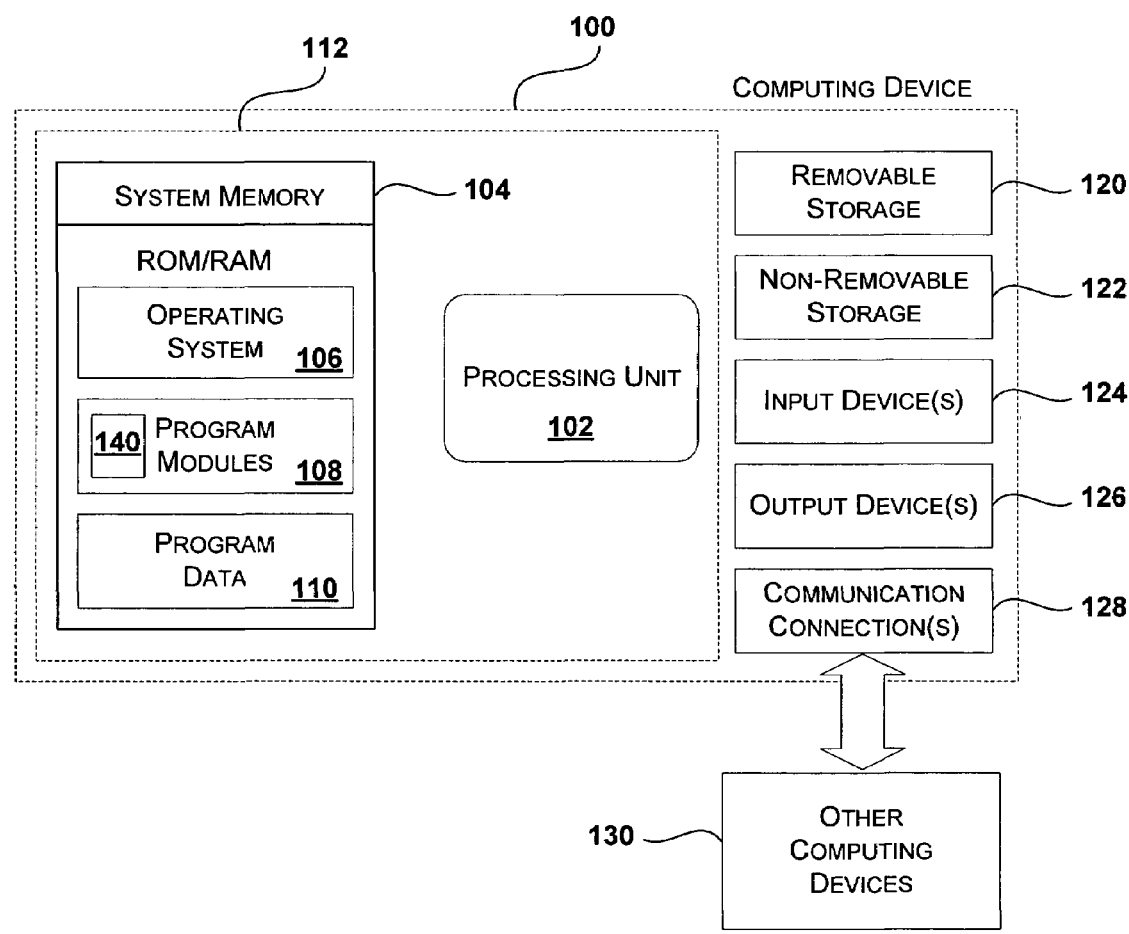
FIG. 1 is an illustrative computing device that may be used to implement the communication techniques and mechanisms described herein.

FIG. 1 is an illustrative computing device that may be used to implement the communication techniques and mechanisms described herein. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.;) or some combination of the two. System memory 104 typically includes an operating system 106, one or more program modules 108, and may include program data 110. The program modules 108 may include one or more components 140 for implementing the present push-to-talk functionality. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 124 such as keyboard, mouse, pen, voice input device, touch input device, etc. Output device(s) 126 such as a display, speakers, printer, etc. may also be included. These devices are well know in the art and need not be discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media".

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Exemplary System Architecture

Figure 2:
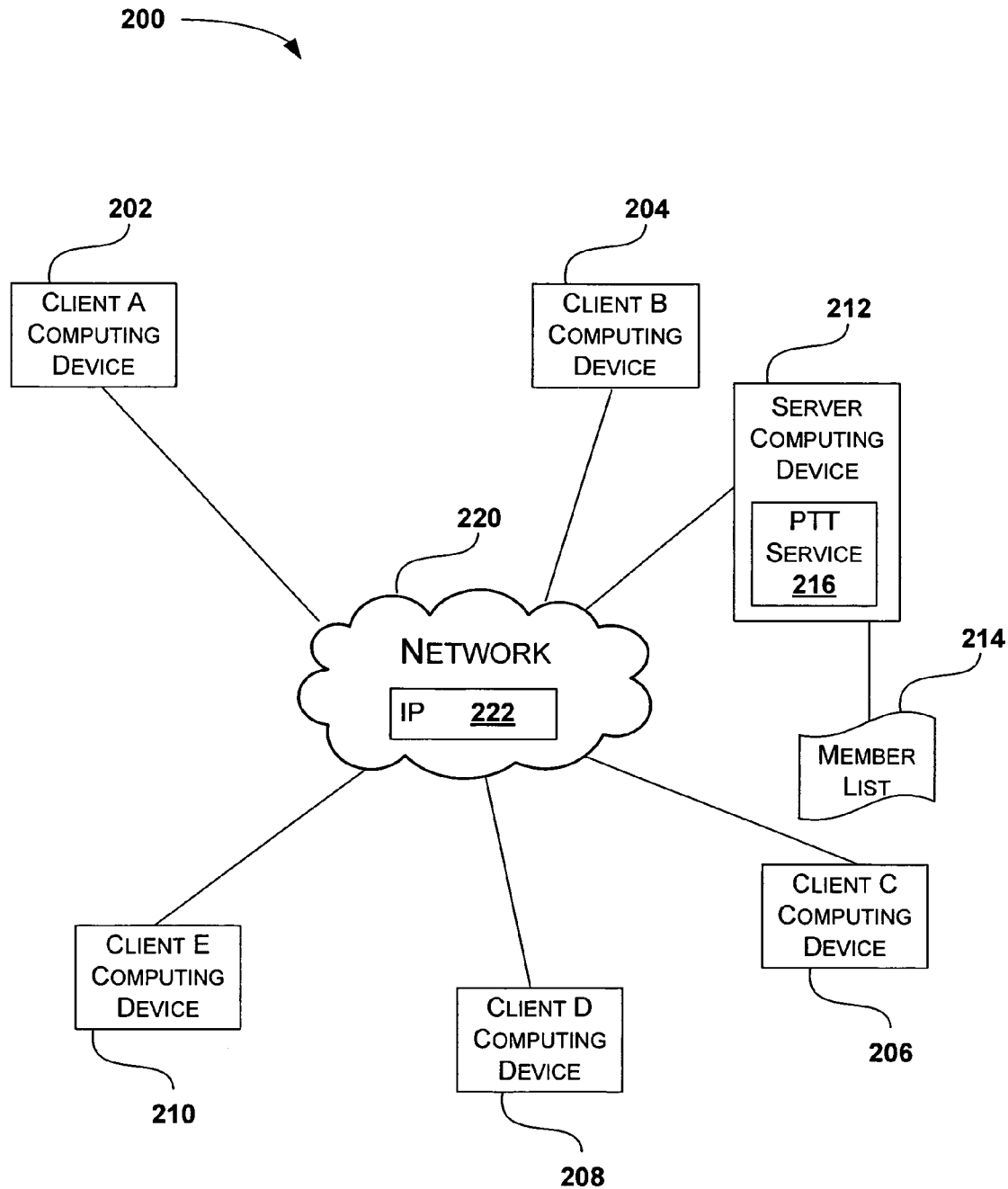
FIG. 2 is an illustrative architecture in which the present push-to-talk communication mechanism may be implemented using several of the computing devices shown in FIG. 1 configured in a client-server architecture.

FIG. 2 is an illustrative architecture 200 in which two or more computing devices, such as computing device 100 shown in FIG. 1, are arranged to implement the present push-to-talk mechanism. The computing device may be a mobile device, a desktop device, a server computer, or the like. The architecture 200 includes one or more client computing devices (e.g., client computing devices 202-210) and one or more server computing devices (e.g., server computing device 212). The server computing device 212 accesses a member list 214 to maintain information about members that are registered to utilize a push-to-talk service 216. The member list 214 is stored on computer-readable storage media accessible to the server computing device 212. The client computing devices and the server computing devices communicate over a network 220, such as a LAN and/or Internet, that implements an internet protocol 222. In one embodiment, the client computing devices and the server computing devices are arranged in a client/server architecture. Even though only one server computing device is shown in FIG. 2, one skilled in the art will appreciate that the functionality provided by the server computing device may be provided using multiple distributed computing devices. Typically, the server computing device 212 is positioned in the public domain, instead of behind a firewall, so that the client computing devices may connect to it.

Push-to-Talk Mechanism

Figure 3:
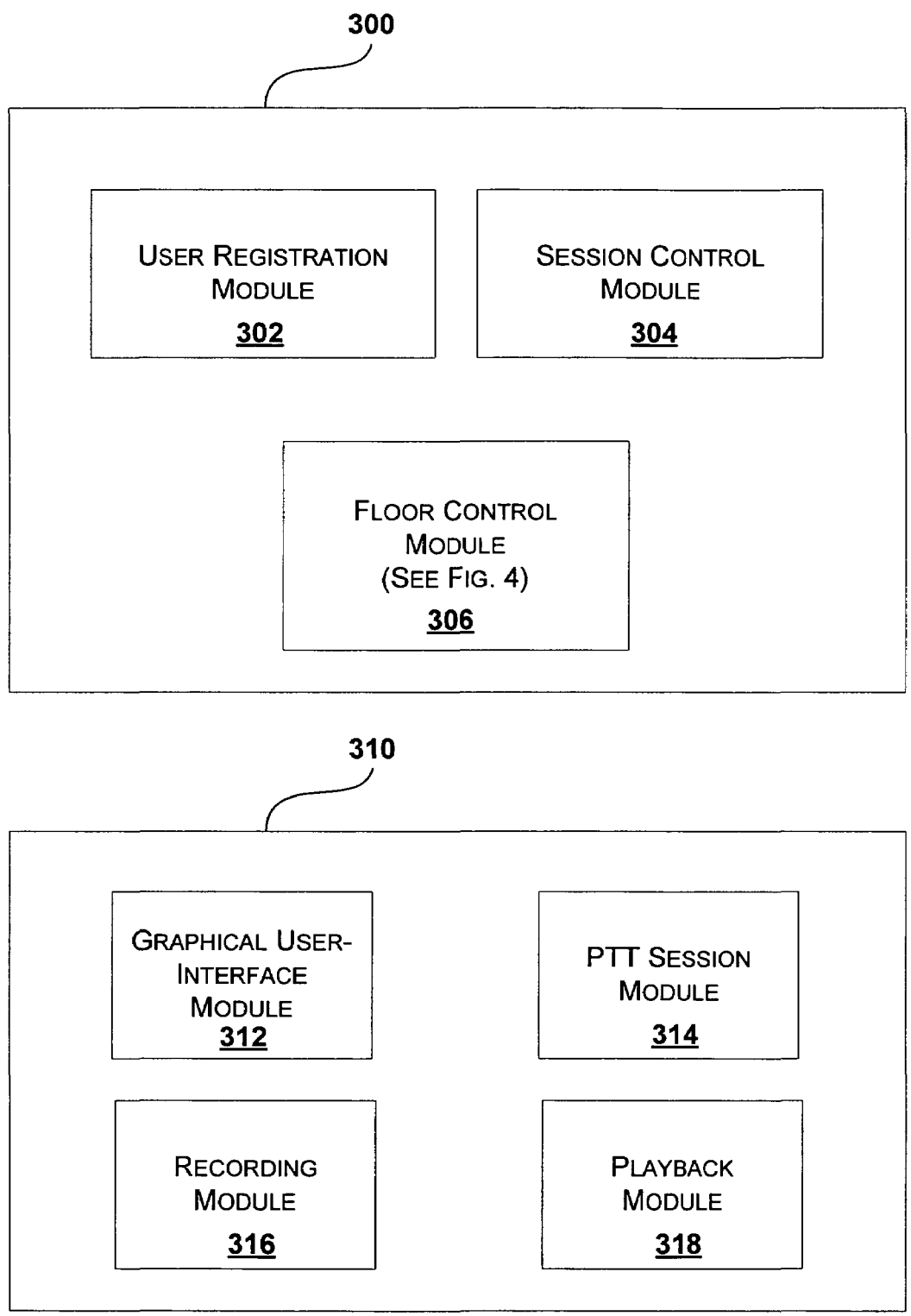
FIG. 3 is a block diagram illustrating push-to-talk components of the server computing device and the client computing device shown in FIG. 2.

FIG. 3 is a block diagram illustrating push-to-talk components 300 and 310 of the server computing device and client computing device shown in FIG. 2, respectively. The server push-to-talk components 300 correspond to the one or more components 140 for implementing the present push-to-talk functionality described in the general description of a computing device in FIG. 1. The push-to-talk components 300 include a user registration module 302, a session control module 304, and a floor control module 306. The user registration module 302 is configured to register users as members of the push-to-talk service. The registration process occurs when users on the client computing devices log on to the server. The server obtains their IP address and other pertinent information. The IP address and other information are then stored in the member list. The registration module 302 is also configured to provide status of an arbitrary member to any requesting client and to retrieve the member list when queried. This type of registration process is well known and is commonly used for registering members for instant messaging service.

The session control module 304 is configured to manage the sessions between the client computing devices. As will be described below, some client computing devices are configured for communicating in one session at a time (hereinafter referred to as one session capable computing devices). Other client computing devices are configured for communicating between multiple sessions at a time (hereinafter referred to as multi-session capable computing devices). The session control module is responsible for maintaining each of these sessions. The session control module is responsible for session start-up, session termination, adding a member to a session, and removing a member from a session. The floor control module 306 is configured to ensure that only one party is talking in a session at one time. Thus, the floor control module ensures that each push-to-talk session operates in a half-duplex mode.

The client push-to-talk components 310 correspond to the one or more components 140 for implementing the present push-to-talk functionality described in the general description of a computing device in FIG. 1. The client push-to-talk components 310 include a graphical user-interface module 312, a push-to-talk session module 314, a recording module 316, and a playback module 318. The client push-to-talk components 310 are described below in more detail, as needed.

Figure 4:
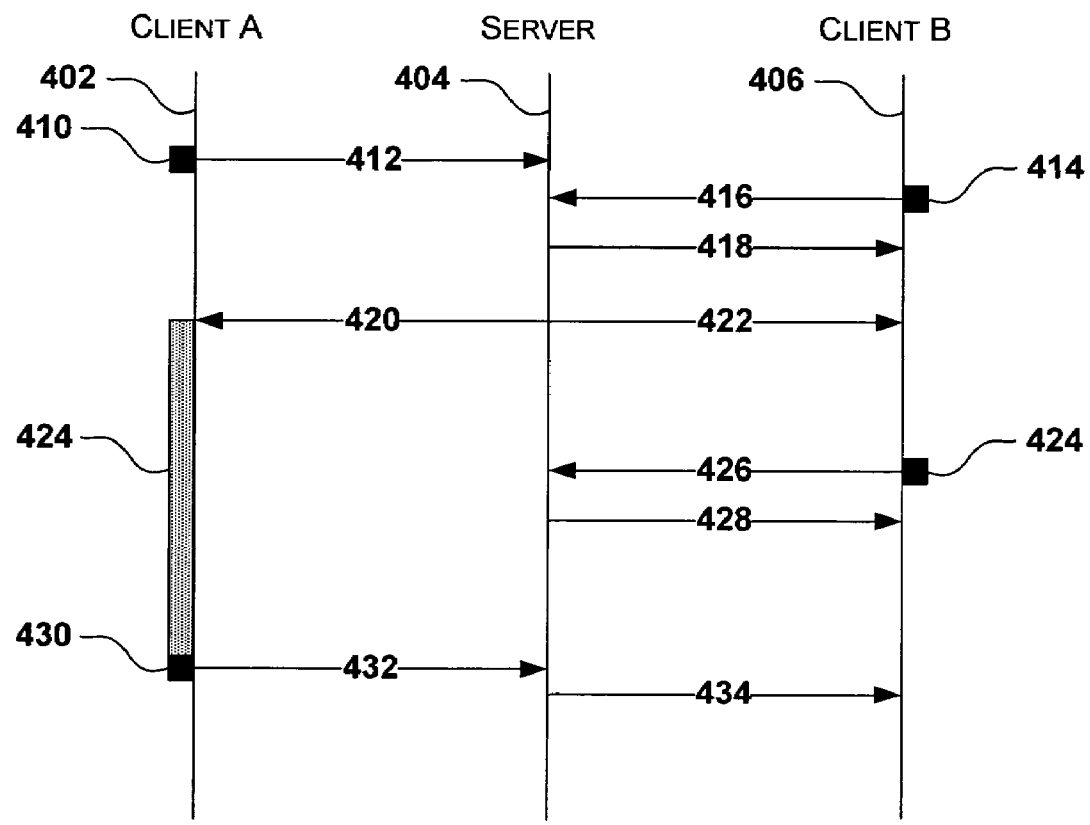
FIG. 4 is a time sequence diagram illustrating a floor control process within the floor control component of the server computing device shown in FIG. 3.

FIG. 4 is a time sequence diagram illustrating a floor control process within the floor control component of the server computing device shown in FIG. 3. The floor control process occurs after a session has been established between two or more parties. As will be described below in conjunction with FIG. 5, there are various ways in which a session can become established. However, once a session is established, the floor control process shown in FIG. 4 begins processing. The floor control process may be configured to be compatible with the floor control specification in the Open Mobile Alliance Push-to-Talk over Cellular (OMA PoC) standard.

The time sequence diagram has three vertical lines 402-406. The first vertical line 402 (hereinafter referred to as client A) represents a client computing device on which the client push-to-talk components reside. The second vertical line 404 (hereinafter referred to as server 404) represents a server computing device on which the server push-to-talk components reside. The third vertical line 406 (hereinafter referred to as client B) represents another client computing device on which the client push-to-talk components reside. The time sequence diagram illustrates the floor control process within the floor control component of the server computing device for controlling the floor between client A and client B during one session.

The floor control process begins with action 402. Action 402 occurs at client A, such as depressing a talk button on a graphical user interface. Action 402 invokes a floor request signal 412 from client A to the server. As long as no other client in the session has already been granted the floor, the server will send a floor grant signal 420 back to client A and a floor taken signal 422 to any of the other clients, such as client B. Upon receiving the floor grant signal, client A may hear an audible beep to indicate that it has been granted the floor. Likewise, client B may hear a different audible beep to indicate that someone else has been granted the floor. This process prevents two clients from taking the floor at the same time. Once the floor has been taken, the client who has been granted the floor will begin talking. The talking alerts other clients that the floor has been taken and is unavailable.

However, before the floor has been granted, another client (e.g., client B) may perform an action 414 that invokes a floor request signal 416. When the server receives this floor request signal 416, the server is aware that client A has already requested the floor. Therefore, the server sends client B a floor deny signal 418. A floor deny signal occurs whenever another client has already started the process for requesting the floor or currently has the floor. For example, later, if client B again performs an action 424 that invokes a floor request signal 426, the server will once again send a floor deny signal 428 back to client B. Until client A performs an end action 430, the server rejects any other client from communicating. When the end action 430 is initiated, a floor release signal 432 is sent to the server from client A. The floor release signal 432 notifies the server that client A no longer wants control of the floor. In other words, client A has ended its audible stream. The server then updates the floor status of the session and sends a floor idle signal 434 to each of the other clients notifying them that the floor is now open for anyone to communicate. When the floor idle signal 434 is received by the clients, the clients may hear a distinct beep indicating that the floor is now open.

Figure 5:
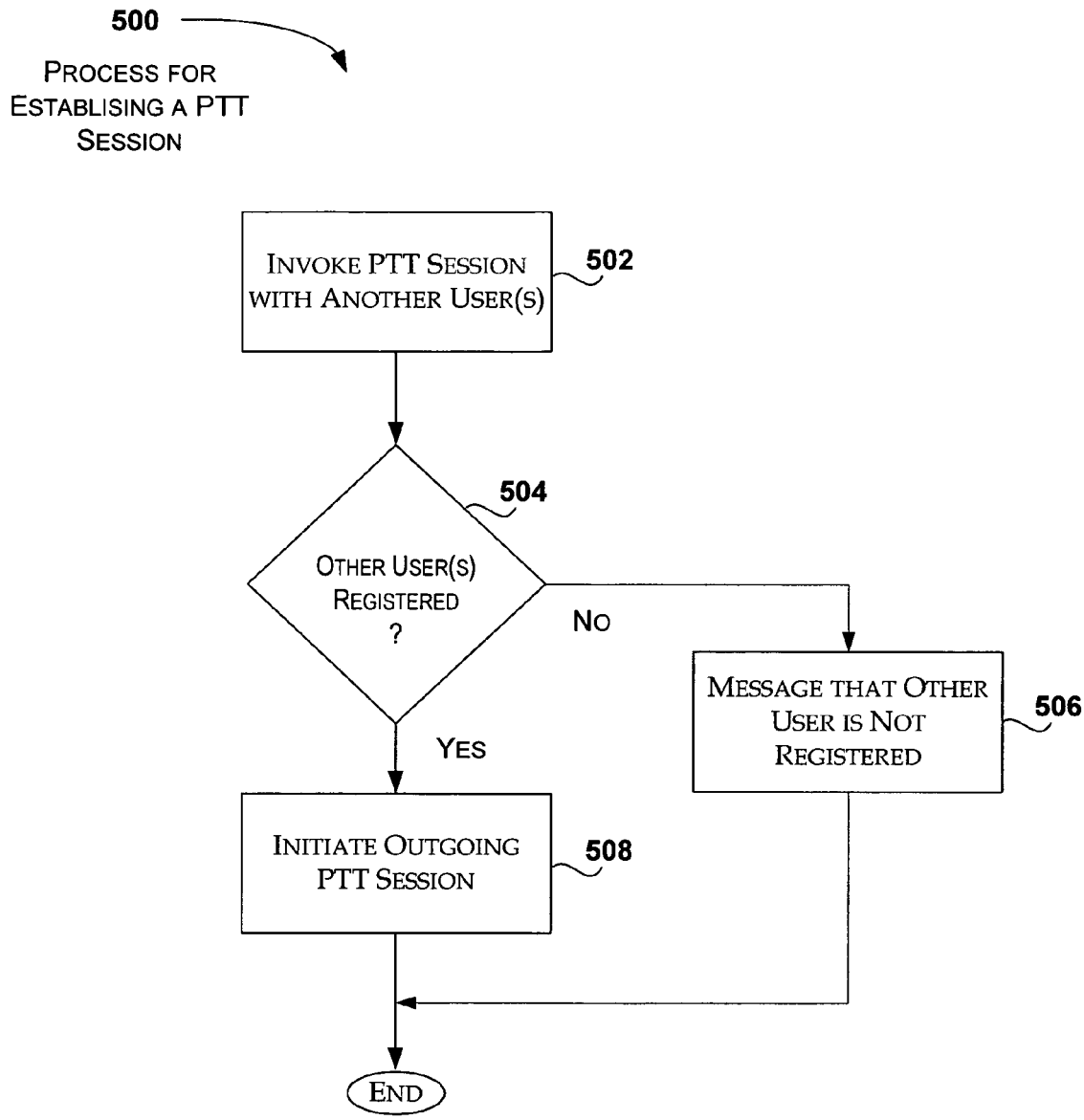
FIG. 5 is a flow diagram illustrating an exemplary process for establishing a push-to-talk session on a client computing device shown in FIG. 2.
Figure 6:
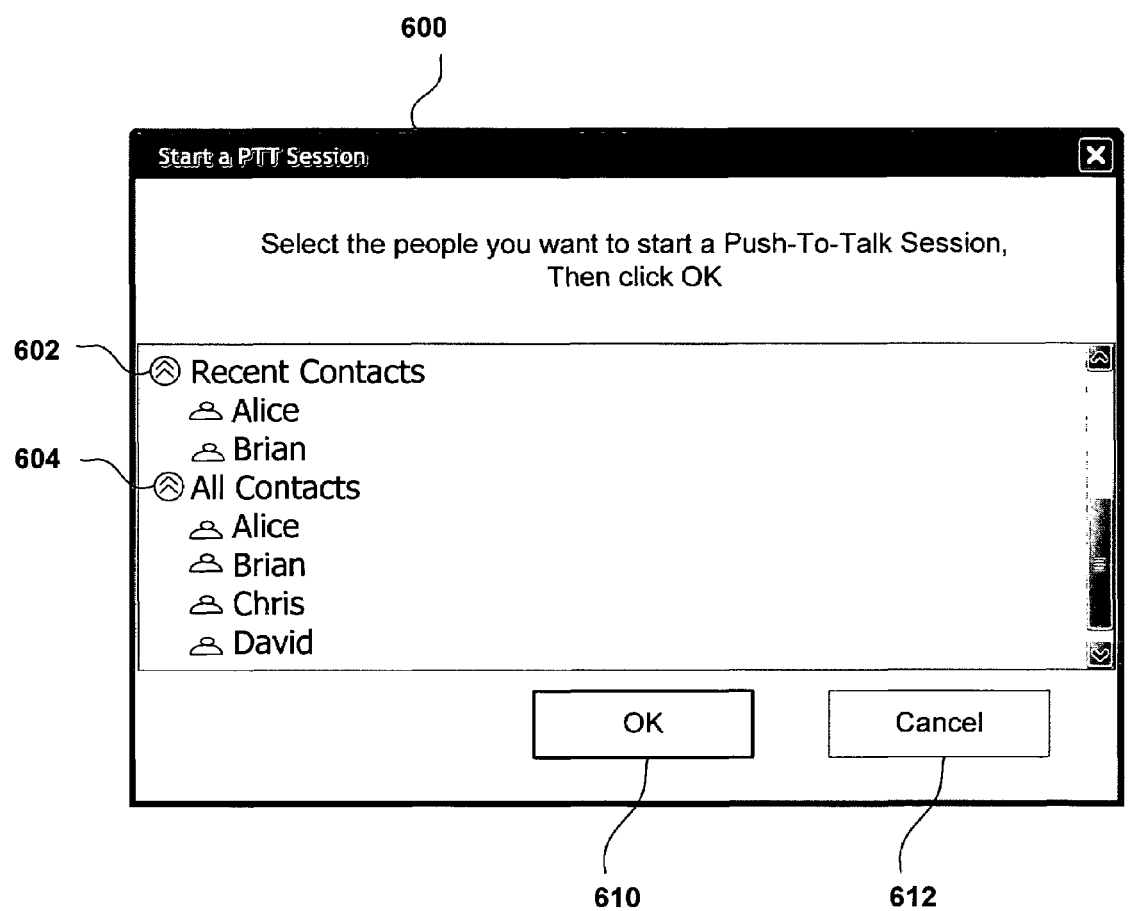
FIG. 6 is an exemplary graphical user interface suitable for use in FIG. 5 to invoke an outgoing session.
Figure 7:
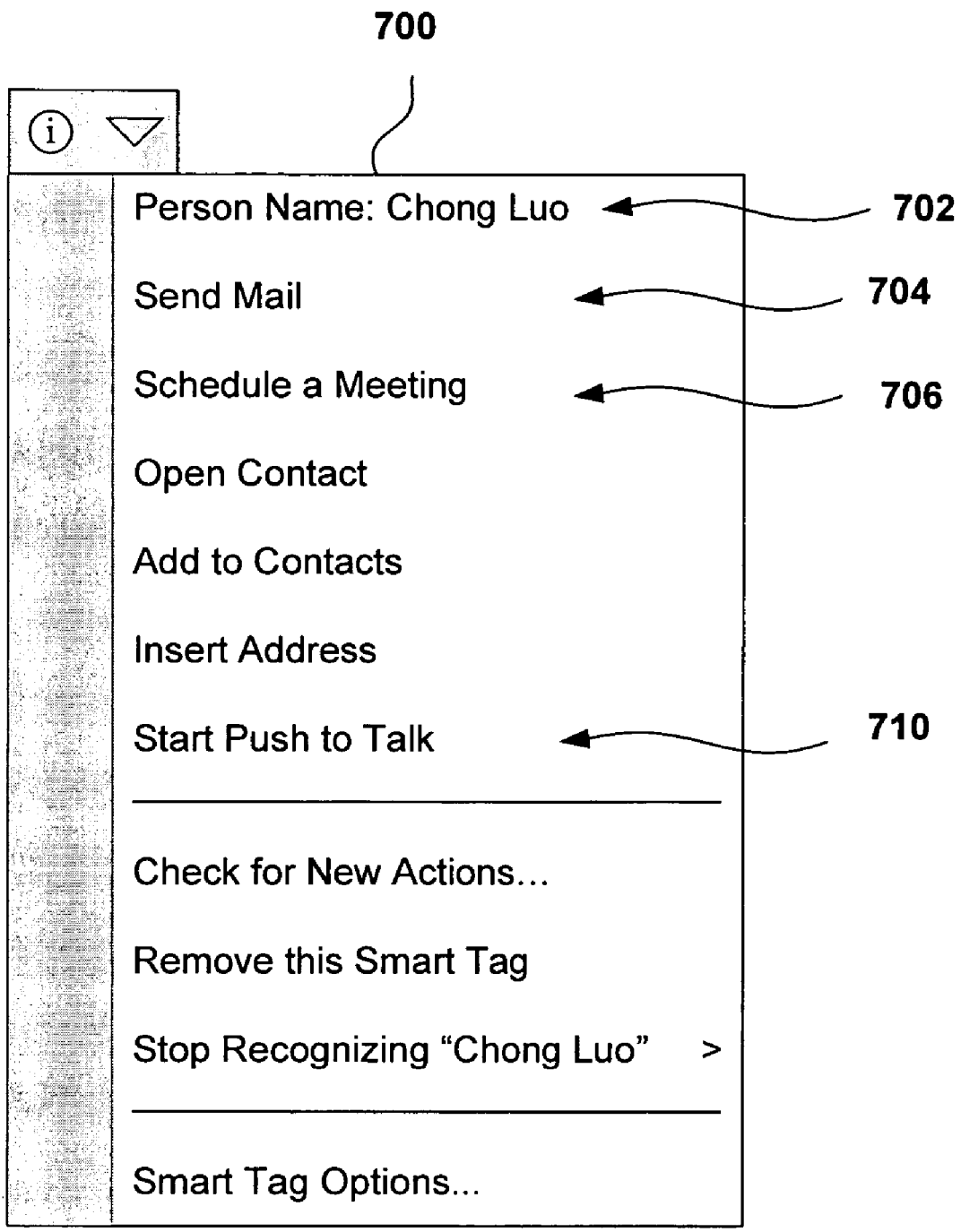
FIG. 7 is another exemplary graphical user interface suitable for use in FIG. 5 to invoke an outgoing session.
Figure 8:
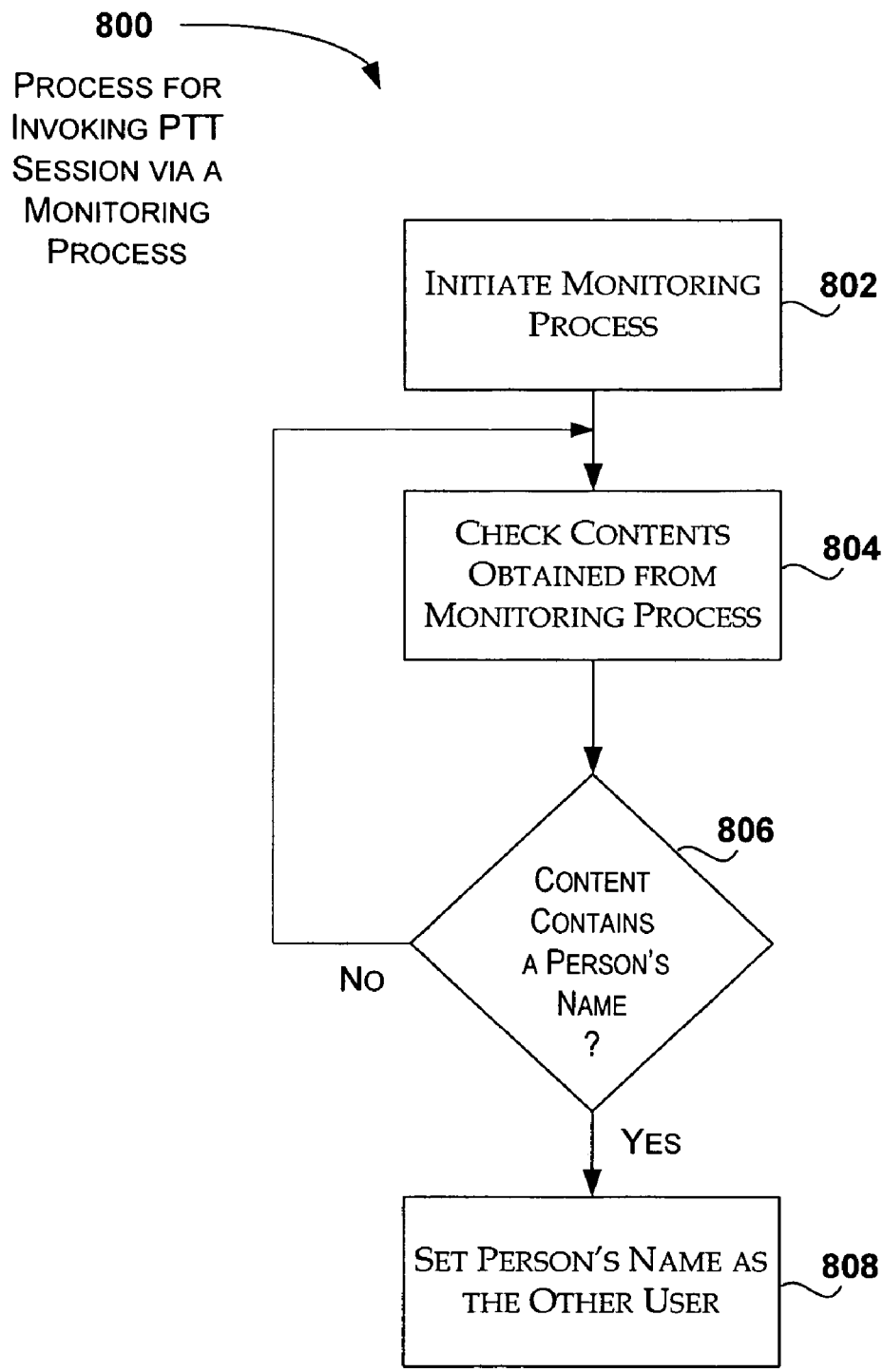
FIG. 8 is a flow diagram illustrating a monitoring process suitable for use in FIG. 5 to invoke an outgoing session.

FIG. 5 is a flow diagram illustrates an exemplary process 500 for establishing a push-to-talk session. Process 500 begins at block 502 where a push-to-talk session is invoked to establish a push-to-talk session with one or more users. Invoking the push-to-talk session may be performed in various manners. FIGS. 6-8 provide three exemplary methods for invoking the push-to-talk session. Processing continues at decision block 504.

At decision block 504, a determination is made whether the other users are registered members with the push-to-talk service. This may involve querying the server to obtain a list of members and then checking whether the users are identified on the list. In another embodiment, information about the other users may be sent to the server who determines whether the users are registered. If it is determined that one of the users is not a registered user, processing continues at block 506.

At block 506, a message may be displayed that alerts the user who attempted to establish the session that one or more of the users are not registered users. At that point, establishing the push-to-talk session may fail entirely and proceed to the end. Alternatively, the user that was not a registered member may be removed as a party to the session and processing may continue at block 508. If all the users are registered users, processing continues at block 508.

At block 508, an outgoing push-to-talk session is initiated between the user and the other registered users. The connections between the users and the other registered users are made using well known techniques. These connections are between each user and the server. The server then receives the audio streams and relays them to the correct parties. Processing is then complete.

FIG. 6 is an exemplary graphical user interface suitable for use within FIG. 5 to invoke an outgoing session. The exemplary graphical user interface may be displayed on a client computing device upon selecting an icon, menu item, or the like. A window 600 displays a Recent Contacts directory 602 that lists members that the user has recently communicated using a push-to-talk session. In addition, the window 600 may display an All Contacts directory 604 that lists members that are currently logging on the server for the push-to-talk service. Window 600 may also include other directories, such as a Friends directory (not shown), a Work directory (not shown), and/or the like. A member (e.g., Brian) may be selected from any directory. A key combination may also be used to select multiple members. Once all the members that are desired in the session have been selected, the OK button 610 is selected. This sends a message to the server so that the server can add an entry to the active session table.

FIG. 7 is an exemplary graphical user interface suitable for use within FIG. 5 to invoke an outgoing session. Typically, the drop-down menu 700 appears while within an application that is configured to recognize names. These applications, such as a word processing application or email application, may add an indicator with the recognized name, such as adding a dashed line under the recognized name. The dashed line then indicates that additional actions are available in conjunction with the recognized name. These additional actions appear as menu items in the drop-down menu 700, such as sending an email to the recognized name (item 702), scheduling a meeting with the recognized name (704), and the like. A script is written to add a menu item 710 to the drop-down menu 700 that initiates a push-to-talk session with the recognized name. Upon selecting the "Start Push-to-Talk" menu item, the recognized name is sent to the server to verify that the recognized name is a registered member. If the recognized name is not a registered member, a message may appear stating that the person is not registered for push-to-talk communication.

However, if the person is registered, the session control module will initiate a session with that person. In one embodiment, the application may support SMART TAG technology provided within MICROSOFT OFFICE software manufactured by Microsoft Corporation located in Redmond, Wash.

FIG. 8 is a flow diagram illustrating a monitoring mechanism suitable for use within FIG. 5 to invoke an outgoing session. Process 800 begins at block 802 where a monitoring process is invoked to run on the client computing device. In general, the monitoring process may perform in various ways. For example, the monitoring process may monitor a clipboard provided by the operating system executing on the client computing device. In this embodiment, the monitoring process monitors the clipboard at text is cut or copied to it from within one or more applications. In another embodiment, the monitoring process may monitor each of the windows displayed on the screen of the client computing device. Clipboard monitoring and screen monitoring processes are well known and need not be described in further detail. Processing continues at block 804.

At block 804, the content obtained from the monitoring process is checked. This may occur upon receiving an event (e.g., event that content had been cut or copied) or may occur based on a time-interval. Processing continues at decision block 806.

At decision block 806, a determination is made whether the content contains text that is recognized as a person's name. This may be done thru a look-up of common names, heuristics, or the like. If the content does not contain a person's name, the process loops back to block 804 to continue monitoring. Otherwise, the process continues to block 808.

At block 808, the recognized name is set as the other user to whom the push-to-talk communication is to be established. Processing then returns. Thus, as described above, the present communication mechanism allows a session to be initiated whenever a name is recognized. Once a name is recognized, an in-context communication may be invoked that initiates the session. The in-context communication allows users to communicate on a specific topic with other users where the topic is presented. For example, a user can discuss a word-processing document with the author of the word-processing document while within the word-processing application. This is in contrast to current technologies where users initiate sessions within a specific messaging application.

Figure 9:
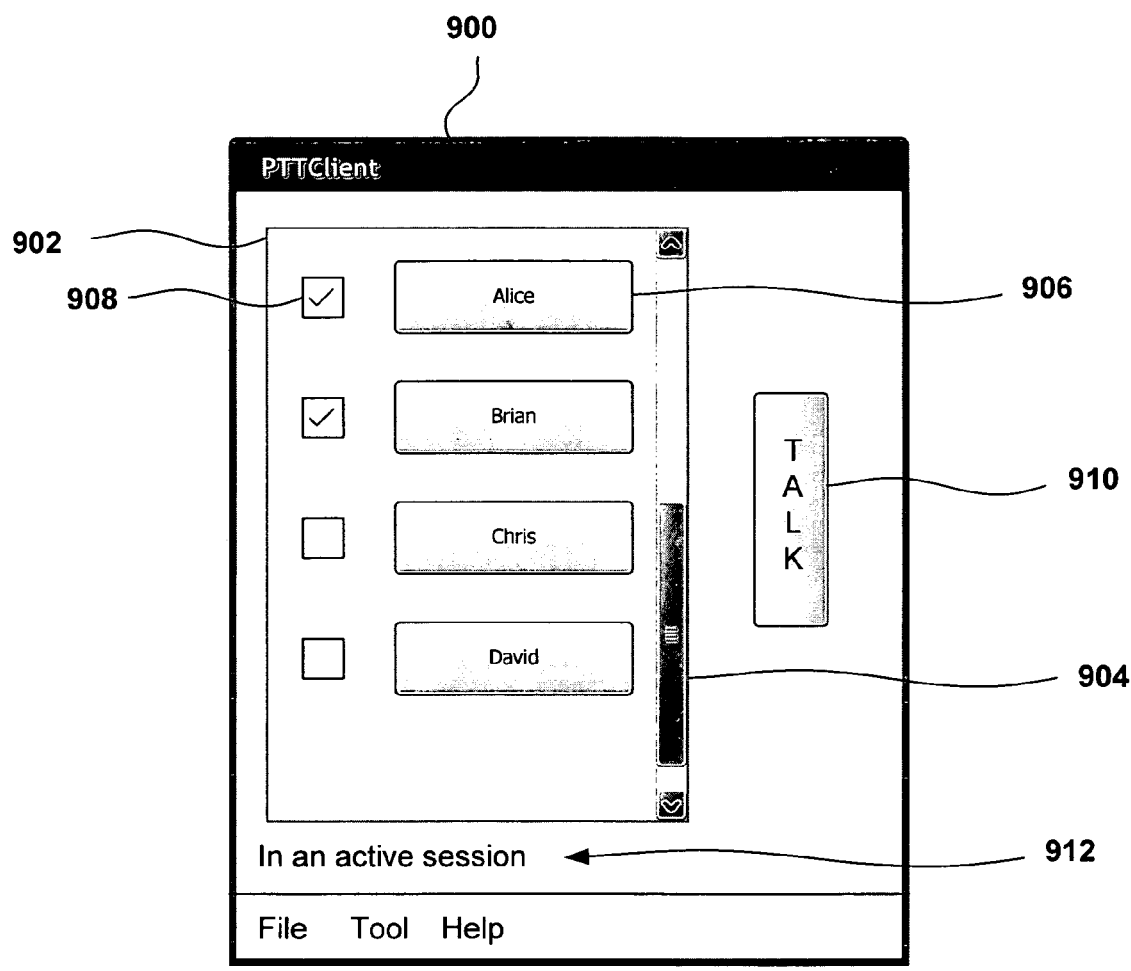
FIG. 9 is an exemplary graphical user interface for a one-session capable client computing device.

FIG. 9 is an exemplary graphical user interface for a one-session capable client computing device. Because some client computing device may have limited computing capability and/or screen size in certain configurations, the push-to-talk client components may limit the client computing device to one active session at a time. This may occur when the client computing device is a mobile computing device. Client computing devices that are limited to one active session are hereinafter referred to as one-session capable client computing devices.

One embodiment of a graphical user interface for a one-session capable client computing device is shown in FIG. 9. The graphical user interface 900 combines a contact list with an active session window to provide a single user interface for the push-to-talk client application. Thus, graphical user interface 900 includes a list box 902 with a scroll bar 904. The list box 902 includes a member push button (e.g., member push-button 906 for Alice) for each member that has been registered on the server. Alternatively, the list box 902 may include a member push button for each member that has been registered on the server and that has been identified as a member that the user of the client computing device is interested in communicating with at some time. The list box 902 also includes a check box (e.g., check box 908) that is associated with one of the member push buttons. FIG. 9 illustrates four member push buttons each having their own respective check box. Graphical user interface 900 also includes a talk push button 910 and a status field 912.

In operation, a one to one audible conversation may be initiated by pushing the member push button associated with the desired member. In this scenario, the check boxes are not used and may all be unchecked. Once the desired member's push button is pushed, the push-to-talk conversation is started and the floor control described in FIG. 4 is implemented throughout the conversation. A one-to-one conversation may also be initiated by checking the check box associated with the desired member and then pushing the talk push button 910. The talk push button 910 is the graphical element responsible for activating the floor signals 412 and 432 shown in FIG. 4.

A multi-party conversation may be initiated by checking each of the check boxes associated with the desired members. For example, graphical user interface 900 illustrates the check boxes for Alice and Brian being checked. Once the check boxes for the desired parties have been checked, the user pushes and holds the talk push button 910 which initiates the multi-party push-to-talk session and starts the conversation. Alternatively, after the check boxes have been checked, the user may push any one of the member push buttons that are associated with a checked check box to initiate the multi-party push-to-talk session and start the conversation.

After a one-to-one or a multi-party session is active, another member may be added to the session by checking the check box associated with the other member or by pushing the push button associated with the other member. This information is then sent to the server. At the server, the session information is updated accordingly.

Figure 10:
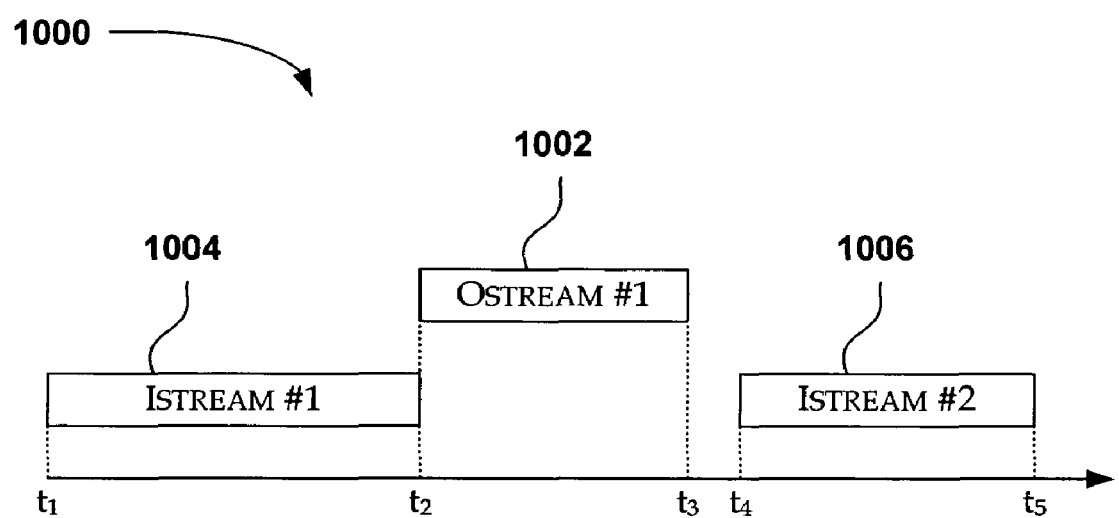
FIG. 10 is a timing diagram that illustrates logic for handling incoming and outgoing audible streams in a one-session capable client computing device.

FIG. 10 is a timing diagram that illustrates logic for handling incoming and outgoing streams for one push-to-talk session 1000 in the one-session capable client computing device. Referring to FIG. 10, at time t1, incoming stream 1004 becomes active. If at time t2 the user initiates an outgoing stream (e.g., outgoing stream 1002), the incoming stream 1004 ends so that the outgoing stream 1002 can establish a new session. If the earlier session is a one-to-one session, the session ends. However, if the earlier session is a multi-party session, the other parties may remain in the session, but the current user is removed from that session. When the outgoing stream 1002 ends at time t3, another session may be established or another stream in the same session as outgoing stream 1002 may occur.

Figure 11:
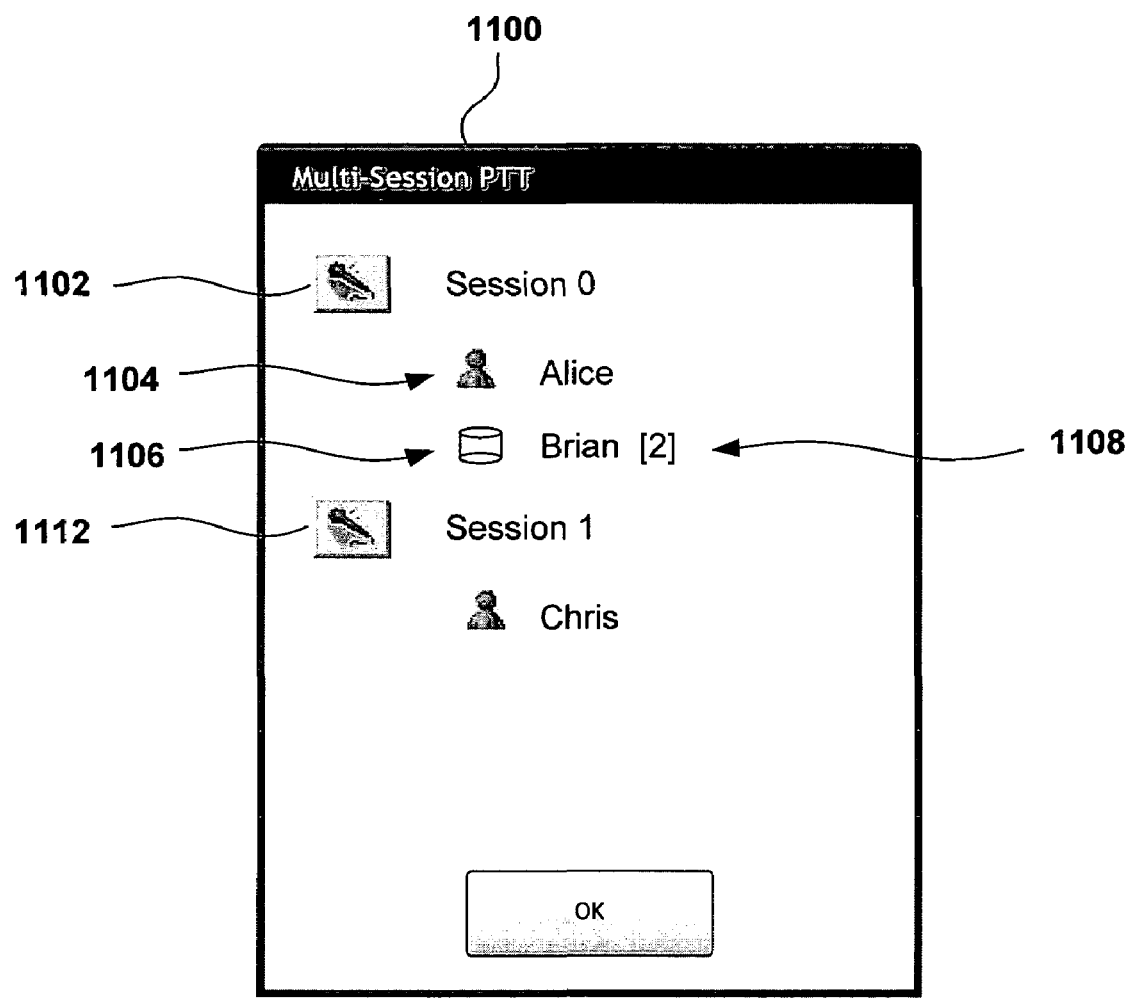
FIG. 11 is an exemplary graphical user interface for a multi-session capable client computing device.

FIG. 11 is an exemplary graphical user interface for a multi-session capable client computing device that illustrates one embodiment for an active session window 1100. The multi-session capable device may also uses the contact list window 500 illustrated in FIG. 5 to first select which members to include in the push-to-talk session. Once the session is active, active session window 1100 is displayed. The active session window includes indicators for each active session, such as indicator 1102 and 1112. The indicators may also perform the function of the talk push button explained above. In addition, the active session window 1100 displays a name for each member that is a party to the session. A first icon (e.g., icon 1104) may be placed alongside the name to indicate that the member is currently active real-time in the session. A second icon (e.g., icon 1106) may be placed along the name to indicate that the audio stream from that member is currently being saved in a playback file. In addition, active session window 1100 may include a playback message indicator 1108 that identifies the number of playback messages that are available for the associated member. In FIG. 11, the active session window indicates that Brian has two playback messages available. This information is displayed by having "[2]" behind the member's name. Playback messages can be played back by pushing the icon 1106 to initiate the playing of the recorded stream.

Figure 12:
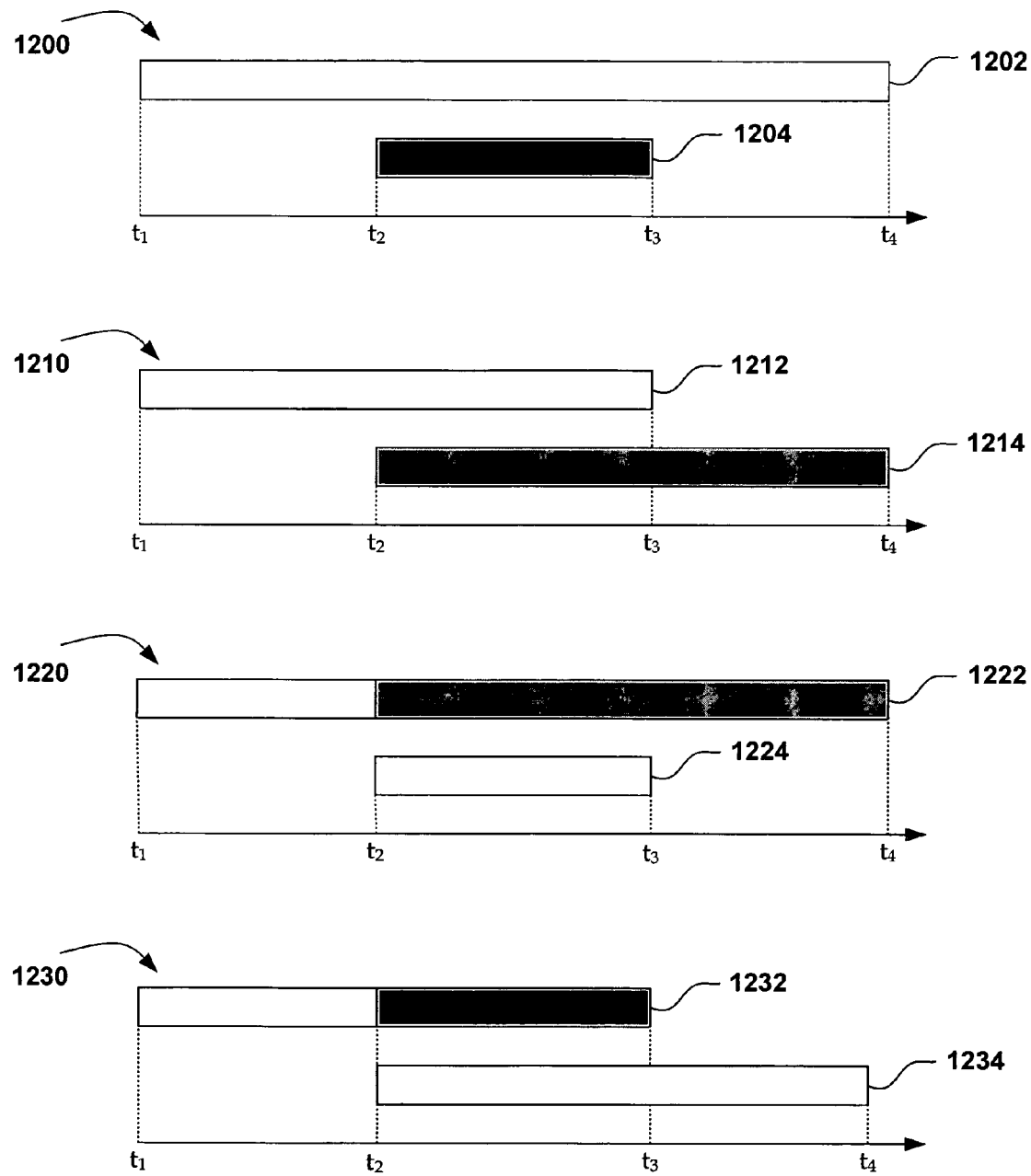
FIG. 12 is a series of timing diagrams that illustrate logic for handling incoming and outgoing streams for multiple sessions in a multi-session capable client computing device.

FIG. 12 is a series of timing diagrams that illustrate logic for handling incoming and outgoing streams from multiple sessions by a multi-session capable client computing device. One should note that each session will typically have many different incoming and outgoing streams during the session. However, because the floor control process limits each session to having one stream at a time, a session will not have an incoming stream and an outgoing stream at the same time. For multi-session capable computing devices, there may be multiple overlapping streams from different session. In FIG. 12, each of the streams from multiple sessions is displayed as a rectangular block along a time axis. For certain streams, a portion of the stream or the entire stream is shown in grey. The grey portion represents the portion of the stream that is recorded as a playback file for later playback. For the timing diagrams illustrated in FIG. 12, an outgoing stream is given higher priority than an incoming stream. However, the priorities for different streams may be user-defined in a manner such that a particular member may be given higher priority than other members and/or higher priority than the outgoing stream. In addition, playback messages may be assigned a unique default priority, the same priority has incoming messages, or the like. For convenience, however, the following discussion describes the timing diagrams using the assumption that the outgoing stream is at a higher priority than any of the incoming streams.

Timing diagram 1200 illustrates an outgoing stream 1202 initiated at time t1 and ending at time t4. During this stream, an incoming stream 1204 is initiated at time t2 and ends at time t3. Because the outgoing stream 1202 is assigned a higher priority, incoming stream 1204 is recorded for later playback. One will appreciate that other incoming streams (not shown) may be initiated during outgoing stream 1202 and/or incoming stream 1204. These other incoming streams would also be recorded.

Timing diagram 1210 illustrates an outgoing stream 1212 initiated at time t1 and ending at time t3. An incoming stream 1214 is initiated at time t2 and ends at time t4. Again, because the outgoing stream 1212 is assigned a higher priority than the incoming stream 1214, incoming stream 1214 is recorded starting at time t2. Interestingly, however, at time t3 when the outgoing stream 1212 ends, incoming stream 1214 remains being recorded until time t4. This is done to maintain the time sequence of incoming stream 1214.

Timing diagrams 1200 and 1210 also illustrate the case when two incoming streams arrive at time t1 and t2, instead of an incoming and an outgoing stream as described above. If two incoming streams arrive, the first incoming stream is played and the later incoming stream is recorded as described above.

Timing diagram 1220 illustrates an incoming stream 1222 initiated at time t1 and ending at time t4. An outgoing stream 1224 is initiated at time t2 and ends at time t3. Because outgoing stream 1224 is assigned a higher priority than the incoming stream 1222, the incoming stream 1222 starts being recorded at time t2 when the outgoing stream 1224 begins. Again, incoming stream 1222 remains being recorded even after the outgoing stream 1224 ends at time t3. Once a stream starts being recorded, the remaining portion of the stream will also be recorded. If incoming stream 1222 is actually a stream that is being played back, the playback of the stream is paused at time t2 and then is resumed at the same position at time t3.

Timing diagram 1230 illustrates an incoming stream 1232 initiated at time t1 and ending at time t3. An outgoing stream 1234 is initiated at time t2 and ends at time t4. Again, because the outgoing stream 1234 is assigned a higher priority than the incoming stream 1232, the incoming stream 1232 starts recording at time t2 and stops being recorded at time t3.

Figure 13:
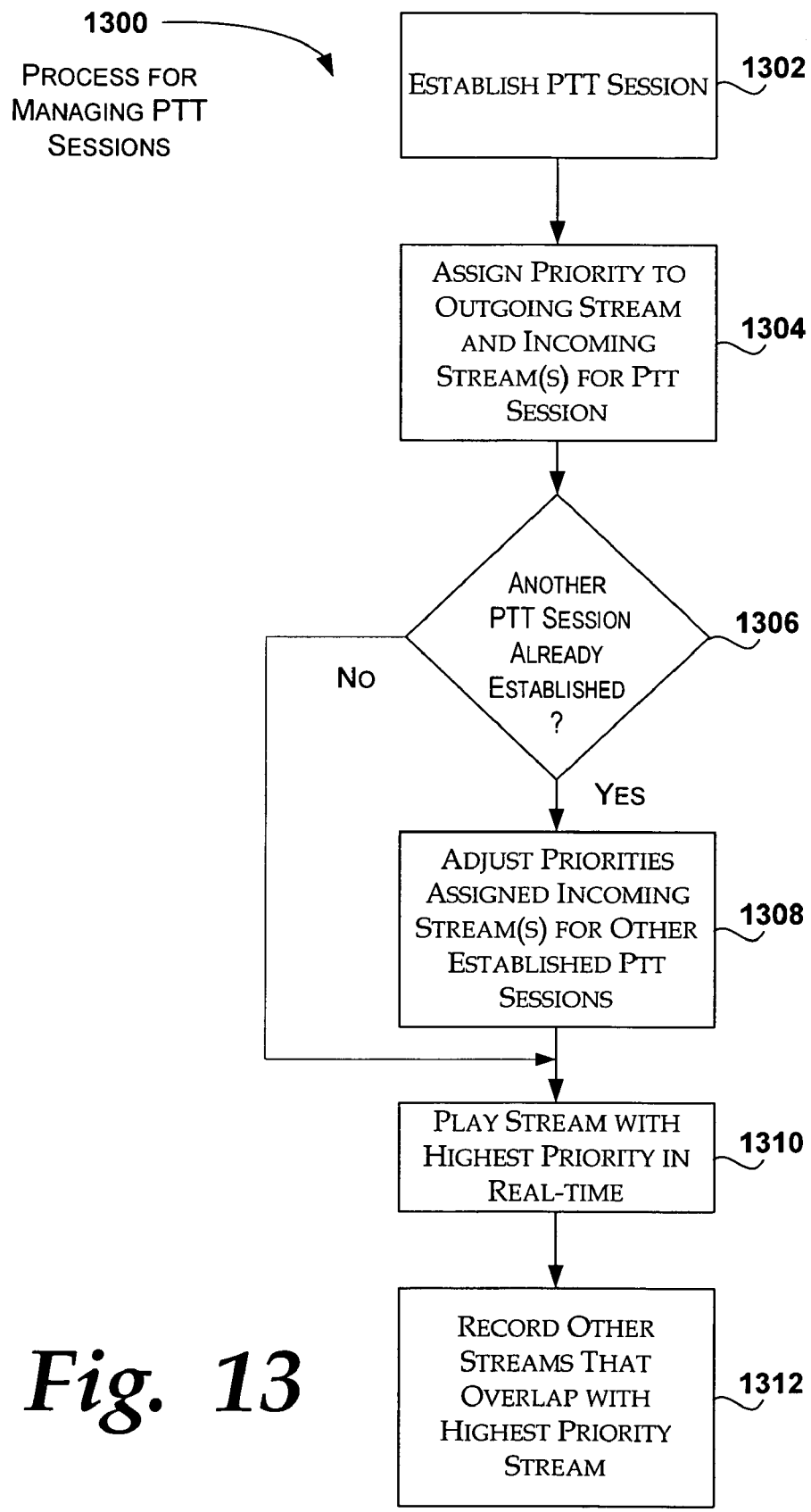
FIG. 13 is a flow diagram illustrating an exemplary process for managing streams in push-to-talk sessions in accordance with the timing diagrams shown in FIGS. 10 and 12.

FIG. 13 is a flow diagram illustrating an exemplary process for managing push-to-talk sessions as graphically depicted in the time sequence diagrams shown in FIGS. 10 and 12 for one session capable computing devices and multi-session capable computing devices, respectively. At block 1302, a push-to-talk session is established as described above in FIG. 5. Processing continues at block 1304.

At block 1304, a default set of priorities are assigned to the outgoing stream and the incoming stream(s). Alternatively, a user may define the priorities for the outgoing stream and each of the incoming streams. For example, a user may define the incoming stream associated with a supervisor at a higher priority than other members in different sessions. Once the priorities are assigned, processing continues at decision block 1306.

At decision block 1306, a determination is made whether another push-to-talk session has already been established. If the computing device is a one-session capable computing device, the establishment of the push-to-talk session at block 1302 ends the previously established push-to-talk session. Therefore, if the prior push-to-talk session is a one-to-one session, the session is no longer active. However, if the prior push-to-talk session is a multi-party session, the user is removed from the multi-party session, but the multi-party session remains active for the other members. If there is not another push-to-talk session that is established, processing continues at block 1310. Alternatively, if there is another push-to-talk session that is established, processing continues at block 1308.

At block 1308, the priorities assigned to the incoming streams for the other established push-to-talk session are modified to accommodate the assigned priorities from block 1304. Again, default priorities may be applied or a user may assign a priority for the streams for each session. Processing continues at block 1310.

At block 1310, the client computing device plays the stream with the highest priority in real-time. Processing continues at block 1312.

At block 1312, the client computing device records other streams that overlap with the highest priority stream as described in the timing diagrams shown in FIGS. 10 and 12. As described above, because the communication in one session operates in a half-duplex mode, a one-session capable computing device will not need to record any of the streams. In contrast, a multi-session capable computing device may need to record one or more streams quite often. These recorded streams may then be later played back. The played back streams are also assigned a priority. Processing is then complete.

During the push-to-talk conversations described above, the member who is granted the floor may begin to speak into a microphone associated with their computing device so that the other members can hear their voice at their computing devices. Because the members are able to hear the voice of each member during the push-to-talk communication, the member's communication experience is richer than pure text based messages. In addition, the communication may be more efficient because speaking is typically faster than typing. Another advantage for multi-party capable computing devices is that the user can easily switch between sessions which allow the user to interleave multiple conversations.

The present push-to-talk functionality may be integrated with existing instant messaging systems in order to provide users different communication experiences. In the workplace, having different communication mechanisms available is quite desirable. This allows each individual the option to choose the best communication mechanism for their immediate purpose. In addition, the present push-to-talk functionality may be integrated with existing push-to-talk services over the cellular network to allow push-to-talk technology to operate on any network utilizing an internet protocol.

In one configuration, the server computing device includes a 3 gigahertz central processing unit and 1 megabyte of memory per each 1000 users. Testing showed that the CPU usage was linear with the user registration process. When the user registration process reached approximately 3000 users/second, the CPU was at 100% usage. It appeared that neither the CPU nor the memory created a bottleneck for providing the push-to-talk functionality. Rather, it was determined that the network capacity limited the number of concurrent sessions that could be supported. Using a GSM 6.10 audio codec operating at 13.0 Kbps, the server computing device supported approximately 4,500 sessions with a 100 Mbps connection.

While example embodiments and applications have been illustrated and described, it is to be understood that the invention is not limited to the precise configuration and resources described above. Various modifications, changes, and variations apparent to those skilled in the art may be made in the arrangement, operation, and details of the disclosed embodiments herein without departing from the scope of the claimed invention.

What is claimed is:

1. A computing device, comprising: a processor;
a memory into which a plurality of computer-executable components are loaded, the plurality of components comprising: p1 a graphical user interface component configured to display a user-interface;
a push-to-talk session component configured to handle multiple active push-to-talk sessions, each active session comprising at least one associated stream selected from a group consisting of an incoming audible stream and an outgoing audible the associated incoming audible stream and the outgoing audible stream operate in a half-duplex mode and operate over a network implementing an internet protocol, wherein the multiple active push-to-talk sessions being responsive to selections entered via the user-interface;
a recording component configured to record one or more incoming streams from the one or more of the multiple active push-to-talk sessions, thereby producing one or more recorded streams, and the recording component being further configured to assign one of incoming streams of the one or more of the multiple active push-to-talk sesions a priority that is lower than a stream that is currently being played; and
a playback component configured to play back the one or more recorded streams.

2. The computing device recited in claim 1, wherein the one or more recorded streams that are currently being played is the outgoing audible stream.

3. The computing device recited in claim 1, wherein the graphical user interface component is configured to initiate the multiple active push-to-talk sessions between two parties.

4. The computing device recited in claim 1, wherein the graphical user interface component is configured to initiate the multiple active push-to-talk sessions among multiple parties.

5. The computing device recited in claim 1, wherein the computing device comprises a mobile device.

6. The computing device recited in claim 1, wherein the computing device comprises a desktop device.

7. A computer-readable storage medium having computer-executable instructions for handling a push-to-talk session, the instructions comprising:
invoking a push-to-talk session between a first client computing device associated with a registered member of a push-to-talk service and a second client computing device, wherein a person's name is recognized within an application on the second client computing device and selecting a push-to-talk menu item associated with the person's name, the person's name representing the second client;
upon verifying that the second client is registered with the push-to-talk service, initiating a push-to-talk communication between the first and second client, the push-to-talk communication operating in an half-duplex manner over a network implementing an internet protocol, the push-to-talk communication comprising an incoming audible stream associated with the second client and an outgoing audible stream associated with the first client.

8. The computer-readable storage medium recited in claim 7, wherein invoking the push-to-talk session comprises selecting an identifier associated with the first client from a contact list displayed on the first client, the client list identifying members that are registered for the push-to-talk service.

9. The computer-readable storage medium recited in claim 7, wherein the application includes an email application where the person's name is recognized from an email address.

10. The computer-readable storage medium recited in claim 7, wherein the application includes a word processing application where the person's name is recognized within a document.

11. The computer-readable storage medium recited in claim 7, wherein invoking the push-to-talk session comprises monitoring a clipboard associated with the first client, recognizing a person's name within the clipboard, and associating the person's name with the second client.

12. The computer-readable storage medium recited in claim 7, wherein invoking the push-to-talk session comprises monitoring an active window on a display of a computing device that is executing the instructions, recognizing a person's name within the active window, and associating the person's name with the second client.

13. A computer-implemented method for managing push-to-talk communications, the method comprising:
establishing a plurality of push-to-talk sessions, each push-to-talk session comprising an outgoing audible stream and at least one incoming audible stream that operate with each other in a half-duplex mode, each incoming audible stream is associated with a different member that is registered for push-to-talk service;
assigning a priority to the outgoing audible stream and to each of the incoming audible streams, the outgoing stream being assigned the highest priority, and one of the incoming streams being assigned a higher priority than another of the incoming steams, based on the member associated with the one incoming stream; and
playing a stream that is assigned the highest priority in real-time and recording any other stream for later playback.

14. The computer-implemented method recited in claim 13, wherein the plurality of push-to-talk sessions operate over a network that implements an internet protocol.

* * * * *